United States Patent [19]
Rona

[11] Patent Number: 5,540,267
[45] Date of Patent: Jul. 30, 1996

[54] TRACTION DEVICE FOR WHEELED VEHICLES

[76] Inventor: Thomas P. Rona, 8104 Hamilton Spring Dr., Bethesda, Md. 20817

[21] Appl. No.: 318,245

[22] Filed: Oct. 5, 1994

[51] Int. Cl.$^6$ .................................................. B60C 27/20
[52] U.S. Cl. ............................. 152/216; 152/219; 152/221
[58] Field of Search .............................. 152/216, 213 R, 152/217, 218, 219, 221

[56] References Cited

U.S. PATENT DOCUMENTS

| | | | |
|---|---|---|---|
| 1,787,608 | 1/1931 | Ansell | 152/216 |
| 2,754,874 | 10/1952 | Gardner | 152/216 |
| 2,947,336 | 2/1959 | Gutierrez | 152/216 |
| 3,016,078 | 5/1960 | Schmidt | 152/216 |
| 3,071,173 | 9/1961 | Hoffmann | 152/216 |
| 3,078,902 | 11/1961 | Scheiduinger | 152/213 R |
| 3,861,752 | 1/1975 | Thurre et al. | 152/216 X |
| 4,576,214 | 3/1986 | Preusker | 152/213 A |
| 4,852,948 | 8/1989 | Vagias | 152/216 X |
| 5,156,695 | 10/1992 | Martin | 152/216 |

*Primary Examiner*—Michael W. Ball
*Assistant Examiner*—Francis J. Lorin

[57] ABSTRACT

A traction device for wheeled vehicles comprises a frame for securing to a wheel of a vehicle; a grip enclosure operably secured to the frame; a grip assembly radially slidably received within the grip enclosure; and an actuator secured to the frame for extending and retracting the grip assembly in the radial direction of the wheel. The grip assembly includes a flexible outer end portion adapted to automatically follow substantially the peripheral cross-sectional shape of the tire when in the extended position. The grip enclosure includes a guide portion adapted to receive and straighten the flexible outer end portion when the grip assembly is in the retracted position. A sprocket chain is operably secured to the flexible outer end of the grip assembly. It provides rigidity to the flexible outer end in the plane of rotation of the tire and flexibility in the transverse direction into the plane of the tire.

21 Claims, 7 Drawing Sheets

FIG. 1

FIG_2

TRACTION DEVICE FOR WHEELED VEHICLES

FIELD OF THE INVENTION

The present invention generally relates to traction devices for wheeled vehicles that are interposed between the tires and the road or ground during slippery road conditions, and particularly to traction devices that are secured to the wheels of the vehicle and activated at will by the driver without stopping.

BACKGROUND OF THE INVENTION

Wheeled vehicles depend for support, acceleration, deceleration and control on the contact forces acting between the periphery of the traction wheels and the road surface. More precisely, the contact forces are present between the periphery of the tires or other devices surrounding the circumference of the traction wheels and the substances covering the road surface. There is a basic and unresolved problem inherent in providing the appropriate magnitude and direction of the contact forces under all conditions that may arise in the course of utilizing the vehicle.

Traction wheels are defined as those which transmit the mechanical power existing in rotary motion form into forward-acting linear propulsion power for accelerating the vehicle or to balance the passive friction forces which otherwise would tend to decelerate the vehicle from its steady motion. Traction wheels (as well as other wheels not used for transmitting forward-acting propulsive power) also serve for transmitting braking power at the discretion of the driver, when deceleration of the vehicle is necessary. Except for the fact that braking power can be transmitted by traction wheels as well as by others not used for forward traction, the braking forces are in all respect similar to the forward traction forces but act in the direction opposed to the latter.

When the vehicle is not moving in a straight line or when the longitudinal axis of the vehicle is inadvertently or accidentally out of alignment with its intended trajectory, forces other than those required for propulsion or braking arise. These act in directions perpendicular to the traction and/or braking forces and are aimed at countering the centrifugal forces arising from the curvilinear motion of the vehicle, or at reestablishing the alignment between the longitudinal axis of the vehicle and its intended trajectory. For the purpose of the present invention, the contact forces described herein are called "control forces", to distinguish them from the "propulsive" or "braking" forces described above.

While the weakening or disappearance of propulsive forces is a serious matter, insofar as the safe and efficient operation of the vehicle is concerned, the absence or loss of braking forces, or the absence or loss of control fores can result in catastrophic consequence for the vehicle, its driver and its occupants. For these reasons, vehicle designers provide all practical devices that ensure that all three categories of contact forces (propulsive, braking and control) are maintained under all expected driving, weather and road conditions.

In the most general mode of operation, the wheels are equipped with inflatable elastic tires. The peripheral surface of the tires is reinforced with additional layers of rubber-like material, designed to resist wear due to friction between the road surface and the tire periphery. These layers are also impressed with grooves and indentations called "treads" of many different designs, but all aimed at increasing the tire's friction force limit. When this limit is exceeded by the force caused by the driving or braking torque imposed on the wheel or by the control forces defined above, the tire will "slide" or "skid", that is relative motion takes places between the point of contact of the wheel with the road surface and the corresponding point of the road surface itself. As earlier stated, under these conditions, the acceleration, the deceleration and the directional control capabilities of the vehicle are impaired.

Several design concepts have been proposed to avoid the loss of friction between the wheel periphery and the road surface. The simplest and the most popular is to improve the tire tread design, so as to oppose both peripheral sliding (along the tangent to the cylinder defining the periphery of the tire and in the direction parallel to the rotary motion of the wheel) or transversal sliding (along the perpendicular to this rotary motion). The effectiveness of the tire tread in preventing peripheral or transversal skidding much depends on the tread design (depth, orientation and spacing of the grooves) but mostly on the characteristics of the road surface. Thus, loose sand, mud, soil, dust, oil, water, snow, slush or ice modify the nature and the magnitude of contact forces, and special tire designs are necessary to provide the capability of maintaining adequate control of the vehicle. Such designs could include specially deep treads characteristic of "snow tires" or metal studs incorporated in the tread material ("studded tires"). While offering a measure of improvement, these design concepts are objectionable on account of tire noise on smooth roads and of wear imposed on the road surfaces, respectively. They also prove essentially useless in the presence of deep snow, semi-frozen slush, deep mud or hard-frozen icy road conditions.

Snow-chains are technically acceptable for driving under extreme road conditions. They are loosely tied around the periphery of the tires so as to interpose one or several chain links between the tire periphery and the snow-covered road surface. The weight of the vehicle impresses the chain link(s) in to the relatively soft snow surface so that the latter increase the contact forces (peripheral or lateral) required to cause relative motion between the chain links and the snow-covered road surface layer. Through other elements of the chain, the increased contact forces are transmitted to the wheel itself, providing thereby propulsive or braking or lateral control forces to the vehicle. For long stretches of uniformly snow-covered roads, snow-chains provide an effective means for enhancing or recovering the contact forces between the vehicle and the road which otherwise would be lost through the slippery nature of the road surface. Nonetheless, snow-chains are less than fully satisfactory as a solution to the loss-of-traction, loss-of-braking and loss-of-control forces problem because: (a) they must be manually attached to the wheels, either prior to the vehicle leaving the departure point or at the point of entering snow covered road stretches; (b) they must be manually removed, once the conditions calling for their use in the first place, have changed to the degree that their use is no longer required, or is fact prohibited so as to preclude damage to the road surface; (c) they are relatively ineffective once the road surface is covered with frozen slush or smooth-worn but hard-frozen ice. In point of fact, the inconvenience of attaching and removing snow chains under inclement outdoors conditions is compounded by the dangers of lifting the vehicle wheels by means of hand-operated jack on the snow or slush covered roadside. This inconvenience and these dangers prompt potential users of snow-chains to avoid their use unless absolutely necessary or mandated by the police.

OBJECTS AND SUMMARY OF THE INVENTION

It is an object of the present invention to provide a traction device for wheeled vehicles that provides contact forces, adjustable at the will of the driver, between the vehicle and the road surface.

It is another object of the present invention to provide a traction device that is secured to the wheels of the vehicle and its use does not require dismounting by the driver or stopping the vehicle.

It is still another object of the present invention to provide a traction device to allow operation of vehicles designed for road usage under moderate "off-road" conditions, that is, on surfaces which would otherwise be inaccessible to wheeled vehicles because of their inclination or surface texture.

It is another object of the present invention to provide a traction device for wheeled vehicles that provides improved braking and control forces through its use on roads covered with snow, dust, sand, mud, slush, ice, etc.

This and other objects of the present invention will become apparent from the following detailed description.

DETAILED DESCRIPTION OF THE INVENTION

Figure 1:
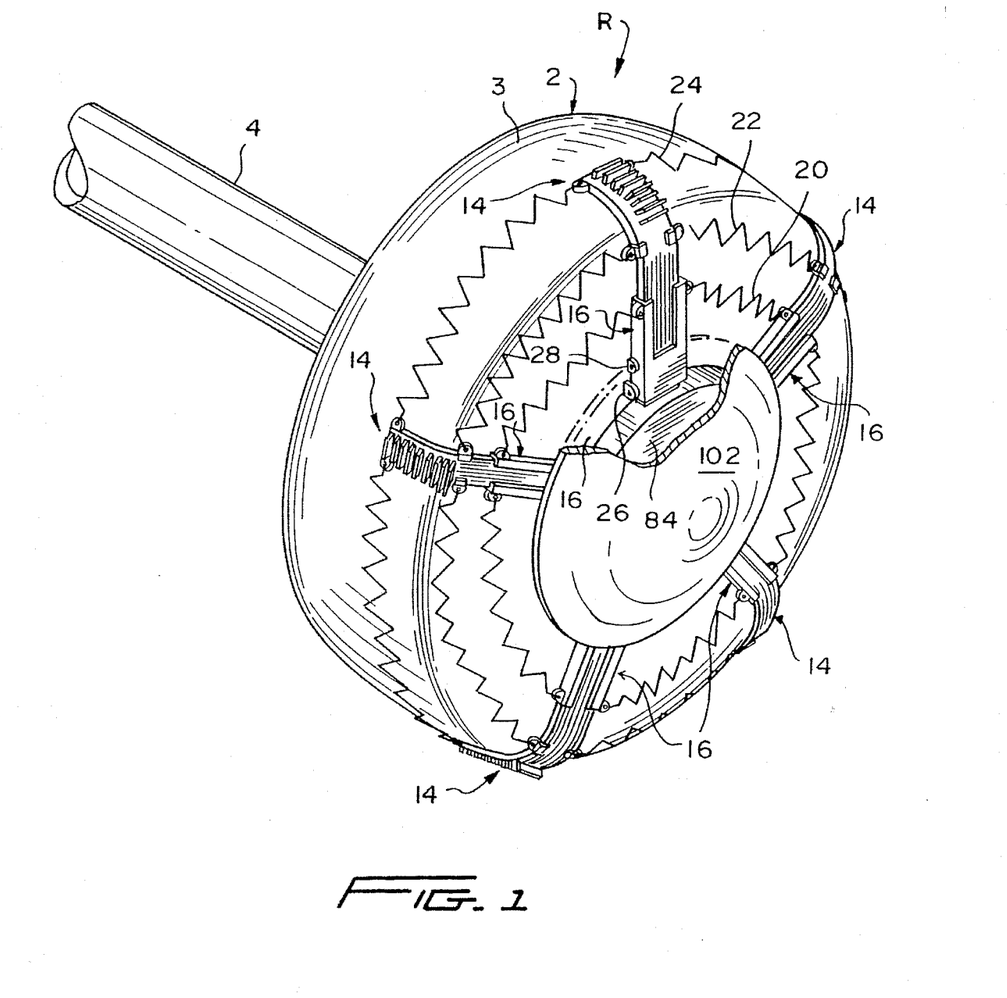
FIG. 1 is a perspective view of a wheel with a traction device in a deployed position in accordance with the present invention.

A traction device R in accordance with the present invention is disclosed in FIG. 1. The device R is shown secured to a wheel 2 with a tire 3 driven by an axle 4 of a motor vehicle (not shown). The device R is shown in its extended or operative position in FIG. 1 and in its retracted or inoperative position in FIG. 2.

Figure 3:
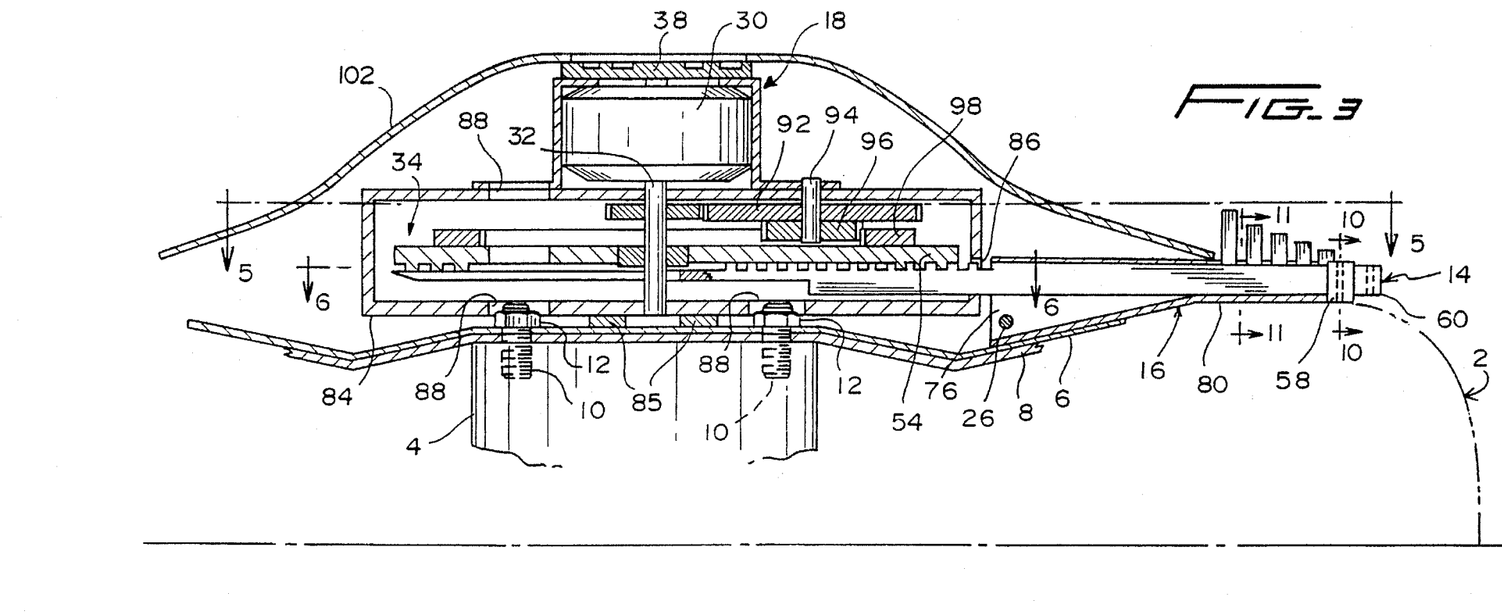
FIG. 3 is a fragmentary cross-sectional view taken along line 3—3 of FIG. 2, showing the traction device in the retracted position.
Figure 5:
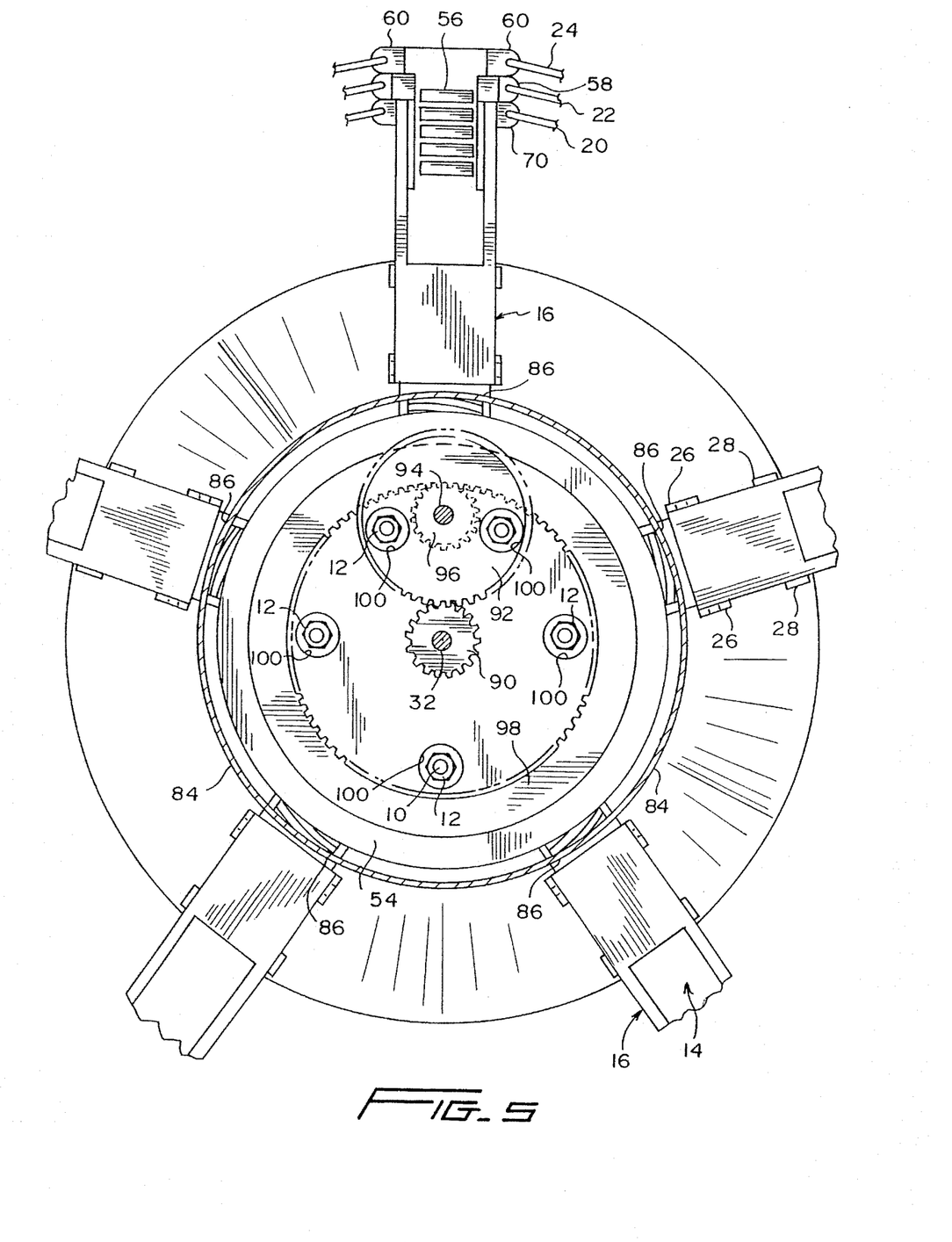
FIG. 5 is a fragmentary cross-sectional view taken along line 5—5 of FIG. 3, showing the actuator gears used in present invention.

The device R comprises a support disk 6 secured to the wheel steel rim 8 of the wheel 2 with the wheel stud bolts 10 and nuts 12, as best shown in FIGS. 3 and 5. The stud bolts 10 and nuts 12 are also used for mounting the wheel 2 onto the axle 4. The support disk 6 is configured such that it can be secured onto the steel rim 8 using the same studs and nuts used for mounting the wheel 2 onto the axle 4.

Figure 4:
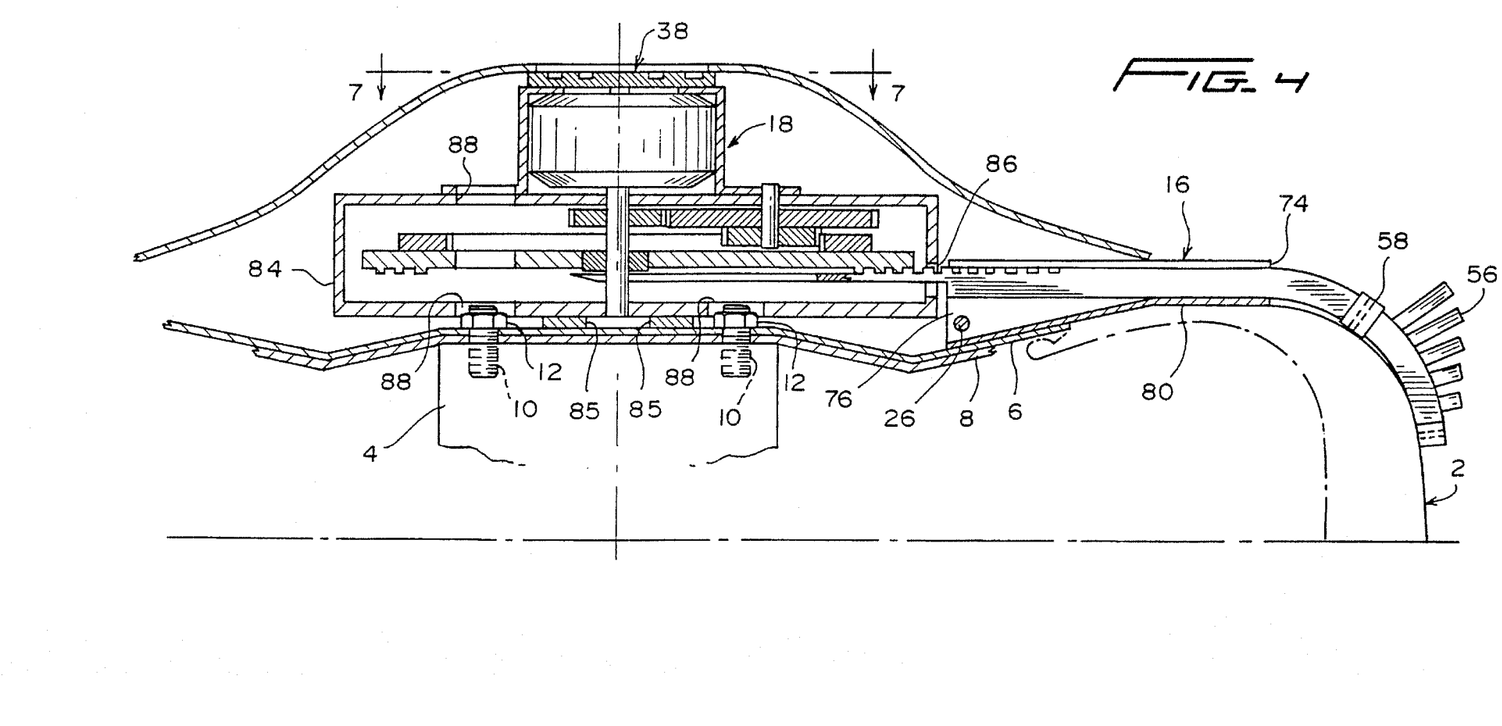
FIG. 4 is a fragmentary cross-sectional view similar to FIG. 3, showing the traction device in a partially extended position.

A plurality of grip assemblies 14 are operably secured to the support disk 6 and are uniformly distributed along the circumference of the wheel 2. Each of the grip assemblies 14 is slidably disposed within an enclosure 16 that is pivotably secured to the support disk 6, as best shown in FIGS. 1, 3 and 4. The number of the grip assemblies 14 may be 5, 6, 7, 8 or any number dependent upon the size of the wheel 2.

Figure 2:
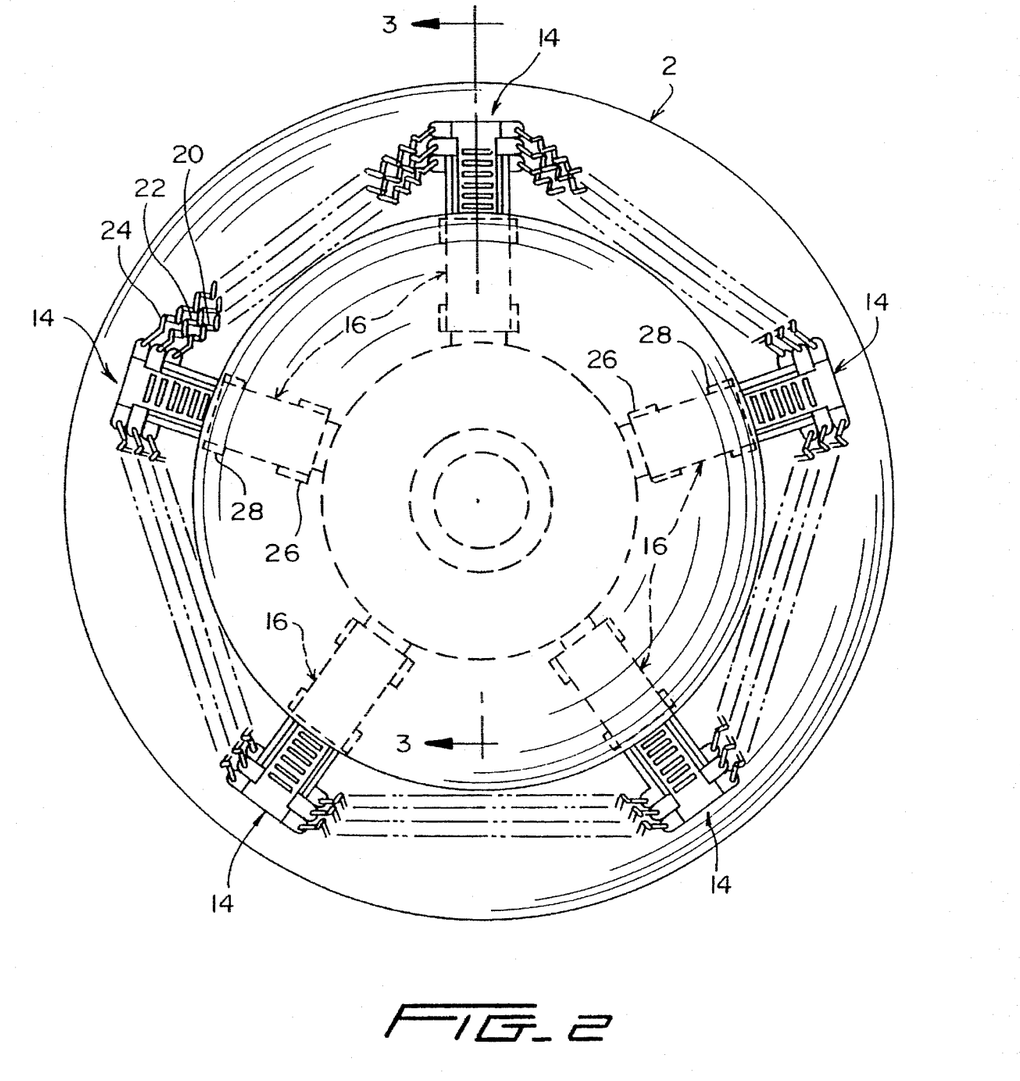
FIG. 2 is a front elevational view of the tire of FIG. 1, showing the traction device in a retracted position.

Each of the grip assemblies 14 is radially retractable into and extendable from the respective enclosure 16 by means of an actuator 18 secured to the support disk 6, as best shown in FIGS. 2 and 3. The grip assemblies 14 extend centrally and radially from the actuator 6, as best shown in FIG. 2.

The grip assemblies 14 are secured at their outer ends by means of a plurality of inner tension springs 20, middle tension springs 22 and outer tension springs 24, as best shown in FIGS. 1 and 2. The inner springs 20 are stationary and secured to the outer ends of the enclosures 16, as best shown in FIG. 1. The middle and outer springs 22 and 24 move with the grip assemblies 14 as they extend or retract, as best shown in FIGS. 1 and 2. The springs 20, 22 and 24 are advantageously under tension when the grip assemblies 14 are extended, thereby to promote the bending of the outer ends of the grip assemblies 14 around the periphery of the wheel 2, as will be further described below. The springs 20, 22 and 24 also advantageously provide lateral support for the outer ends of the grip assemblies 14. The springs 22 and 24 also provide additional traction.

Each of the enclosures 16 is pivotably secured to the support disk 6 by means of pivot 26, thereby permitting some radial motion in the direction perpendicular to the plane of the wheel 2, as best shown in FIG. 3. Lips or protrusions 28 secured to the support disk 6 and disposed on each side of each enclosure 16 advantageously provide lateral support to the respective enclosure 16 while permitting pivotal movement thereby, as best shown in FIG. 5. The lips 28 are cold-pressed from the metal of the support disk 6 or welded onto the disk. Other standard means may be used to secure the lips 28 to the disk 6.

Figure 7:
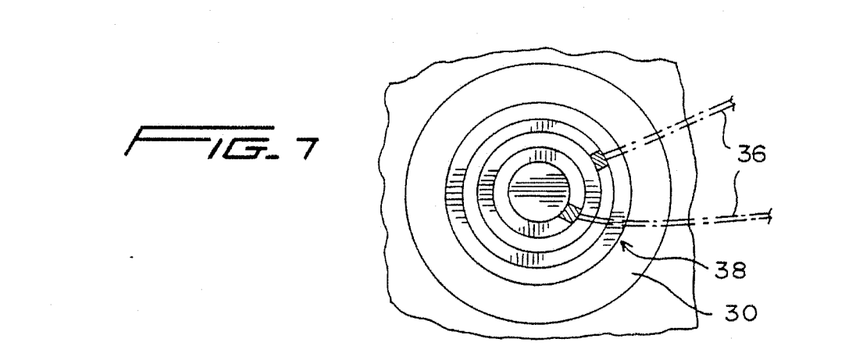
FIG. 7 is a fragmentary cross-sectional view taken along line 7—7 of FIG. 4, showing a slip ring used in the present invention.

The actuator 18 includes an electric motor 30 with an output shaft 32 that drives a set of gears, generally indicated at 34. Wires 36 are operably connected to a standard slip ring connector 38 for delivering power to the electric motor 30, as best shown in FIG. 7. The wires 38 are routed to a power source (not shown), such as the vehicle battery and to a control switch (not shown) preferably within the driver's compartment. The control switch has three positions: "on" (extended grip assemblies), "off" (retracted grip assemblies) and "mid-point" (partially extended grip assemblies). All grip assemblies are in identical positions at all times in any of the switch positions. The wires 36 are suitably supported by standard means (not shown) from the slip ring 38 to the frame of the vehicle.

Each of the grip assemblies 14 transmit the road contact forces directly to the steel rim 8 in addition to whatever the tire 3 may contribute to this transmission. To accomplish its function, each of the grip assemblies 14 are advantageously expandable and retractable, so as to become functional at the command of the operator. Further, each of the grip assemblies 14 are advantageously flexible in the radial plane of the steel rim 8 of wheel 2. Each of the grip assemblies 14 is substantially rigid in the direction tangential to the circumference of the wheel 2.

Figure 9:
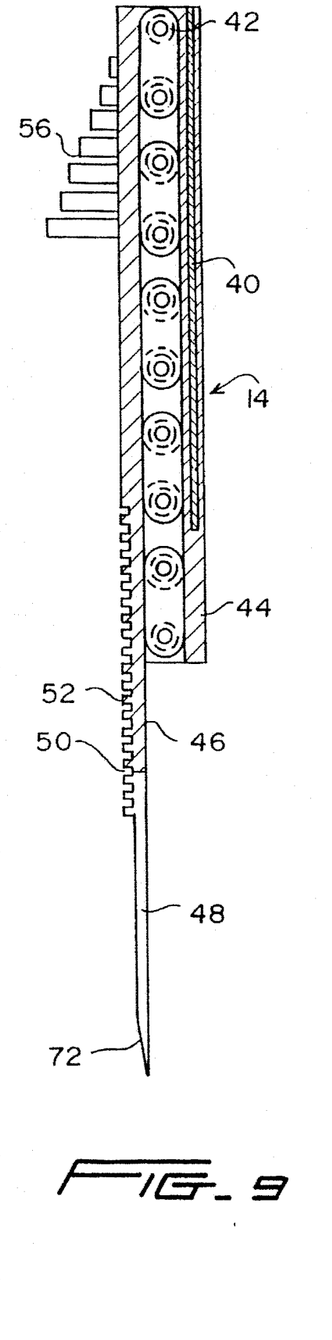
FIG. 9 is a cross-sectional view taken along line 9—9 of FIG. 8.

Each of the grip assemblies 14 includes a thin flexural flat spring 40, sprocket chain links 42 and a flexible plastic body 44. The spring 40 and the chain links 42 are embedded within the body 44, as best shown in FIG. 9. Approximately the outer half of the spring 40 is prebent into a curved shape that corresponds substantially to the cross-sectional shape of the periphery of the tire 3 such that the outer end portion of the respective grip assembly 14 is forced to assume the same shape, as best shown in FIG. 4. The spring 40 is disposed in close proximity to the chain links 42 adjacent the tire 3 so that the permanent curved shape of the spring 40 will impart curvature in the direction of the tire to the grip assembly 14. When each of the grip assemblies 14 is in its fully extended position, the effect of the flexural spring 40 is to press the tip of the grip assembly 14 against the lateral wall of the wheel 3. In this extended position, and owing to the compliance of the flexural spring 40, the grip assembly 14 can accommodate the changes in shape of the wheel 2, caused by changes in tire pressure or elastic deformation due to the radial forces resulting from contact with the road surface under the effect of the weight of the vehicle.

The chain links 42 advantageously provides rigidity to the grip assemblies 14 in the direction of rotation of the wheel 2 and flexibility in the transverse direction into the plane of the wheel 2.

Figure 12:
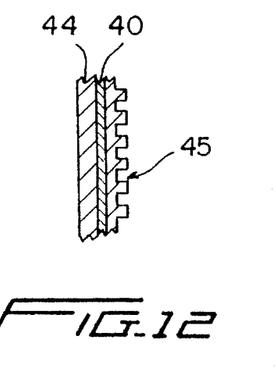
FIG. 12 is an enlarged fragmentary cross-sectional view of the bottom of FIG. 9.

The body 44 is advantageously made from semi-rigid plastic material. The body 44 advantageously keeps the spring 40 and the chain links 42 in their respective positions while allowing flexibility for the assembly as a whole in the direction perpendicular to the plane of the wheel 2. The body 44 also advantageously protects the metal parts of the grip assembly 14 against corrosion, dust, etc. Lateral grooves 45 may be provided on the underside of the body 44 to advantageously facilitate bending of the grip assembly 14, as best shown in FIG. 12.

Figure 8:
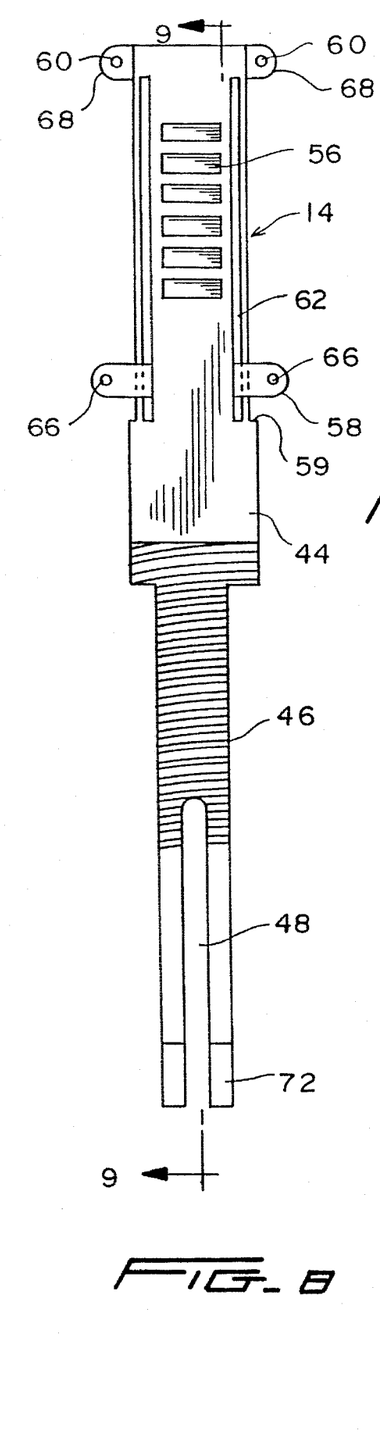
FIG. 8 is top plan view of a grip assembly in accordance with the present invention.

An extension 46 is secured to one end of the body 44 that cooperates with the actuator 18 thereby to retract and extend the grip assembly 14, as best shown in FIGS. 8 and 9. The extension 46 has a longitudinal slot 48 adapted to slidably receive the shaft 32 of the motor 30 when the grip assembly 14 is retracted by the actuator 18. The extension 46 has a plurality of arcuate grooves 50 and arcuate ridges 52 or gear teeth that cooperates with a scroll gear 54 in the actuator 18 thereby to retract and extend the grip assembly 14, as best shown in FIGS. 3, 4, 8 and 9. The extension 46 may be made of metal that is rigidly secured to the chain links 42 or may be plastic molded with the body 44.

The body 44 has a plurality of integrally molded grip threads 56 that advantageously provide additional traction and braking and control forces. Although the grip threads 56 are shown with decreasing height, the grip threads 56 may be formed with equal height.

Figure 10:
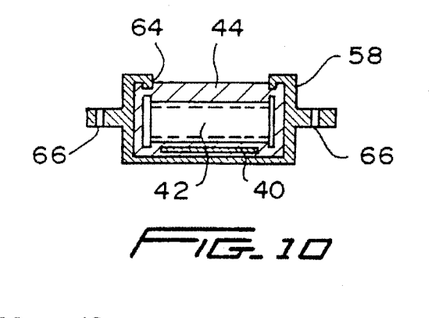
FIG. 10 is a cross-sectional view taken along line 1—10 of FIG. 3.
Figure 11:
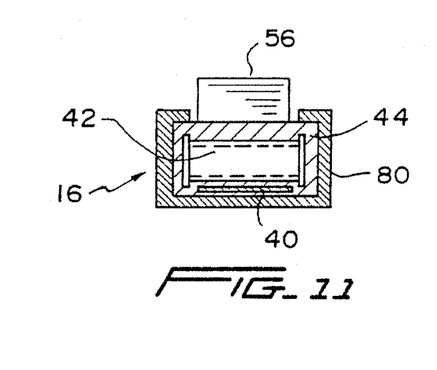
FIG. 11 is a cross-sectional view taken along line 11—11 of FIG. 3.

The tension springs 22 and 24 are secured to the respective grip assemblies 14 by means of connectors 58 and 60, as best shown in FIG. 8. Each of the connectors 58 is slidably disposed in its respective set of grooves 62, as best shown in FIGS. 8 and 10. Each of the connectors 58 is substantially C-shaped in cross-section with inwardly projecting arms 64 that are disposed within the respective grooves 62 to thereby secure the connectors laterally of the body 44 but permit the connectors to move longitudinally thereof, as best shown in FIG. 10. The connectors 58 are therefore advantageously permitted to deploy with the respective grip assembly 14 as it is being extended from its retracted position, as best shown in FIGS. 1, 2, 3 and 4. Shoulders or stops 59 engage the connectors 58 as the grips assemblies 14 are extended, thereby spacing the springs 22 apart from the springs 20 and 24, as best shown in FIGS. 4 and 8. The spring 22 are secured to the connectors 58 through openings 66, as best shown in FIGS. 8 and 10.

The connectors 60 are preferably integrally molded with the body 44. Openings 68 allow the springs 24 to be secured to the connectors 60.

Connectors 70 rigidly secured to the end portions of the respective enclosure 16 provide connection means for the springs 20, as best shown in FIG. 5. Openings in the connectors 70 permit the ends of the springs 20 to be anchored to the connectors 70.

Figure 6:
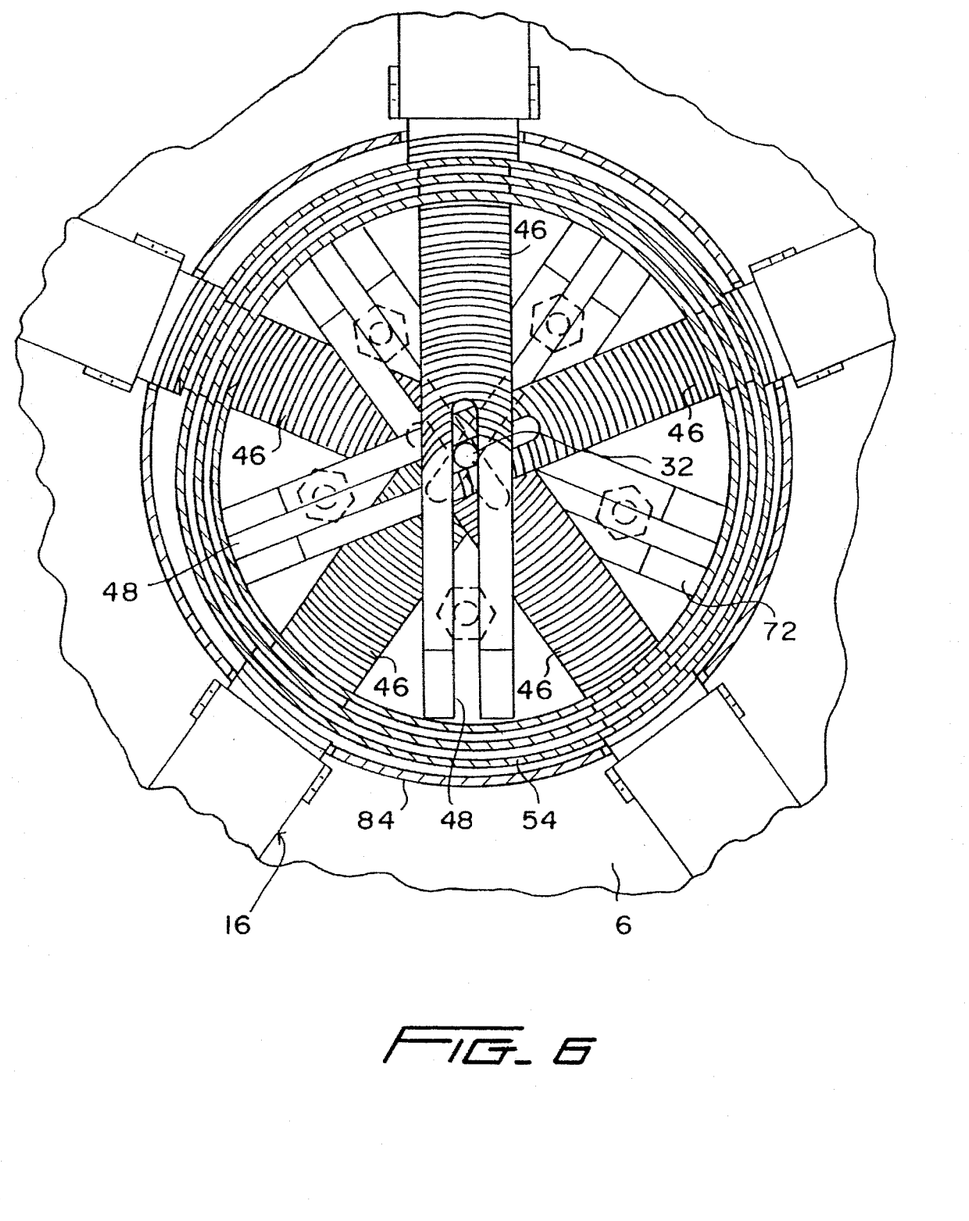
FIG. 6 is a fragmentary cross-sectional view taken along line 6—6 of FIG. 3, showing the arrangement of the inner end portions of the grip assemblies within the actuator housing.

The end portion 72 of the extension 46 is advantageously ramped to facilitate the stacking of the end portions of the extension 46 within the actuator 18 when the grip assemblies 14 are retracted, as best shown in FIG. 6.

The inner, middle and outer tension springs 20, 22 and 24, advantageously reinforce the tendency of the outer end portions of the grip assemblies 14 to gradually fold around the outer periphery of wheel 2 so as to reach the fully extended position, as best shown in FIGS. 1 and 4. The flexural spring 40 has its permanent unstressed shape curved against the lateral wall of the wheel 2, thereby causing the grip assemblies 14 to bend against it when in the extended position. The springs 20, 22 and 24, acting on the grip assemblies 14, advantageously reinforce the tendency for the outer end portion of the grip assemblies 14 to gradually fold around the outer periphery of the wheel 2 so as to reach the full extended position, as best shown in FIG. 1.

Each of the enclosures 16 is substantially a box-like structure with openings 74 and 76 at each opposite ends thereby to permit the respective grip assembly 14 to move therethrough during retraction and extension. The enclosure 16 has a straight portion 80 with a cross-sectional dimension substantially the same as the cross-sectional dimension of the grip assembly 14 such that when the grip assembly 14 is retracted into the enclosure 16, the curved end portion of the grip assembly 14 will attain a straight configuration, as best shown in FIG. 3. Thus, each of the enclosures 16 advantageously permits the respective grip assembly 14 to attain a relatively compact shape when retracted as compared to its deployed curved shape. A slot 82 provides clearance for the grip threads 56 during retraction, as best shown in FIG. 5.

The pivotable connection 26 of each enclosure 16 to the underlying support disk 6 advantageously provides a small relative rotation of the enclosure 16 with respect to the support disk 6 such that the grip assemblies 14 can follow at all times the shape of the tire 3 even when the latter is overloaded or improperly inflated, or both at the same time.

The outer tension springs 24 when fully extended almost reach the center line of the wheel 2. The shape and texture of the outer tension springs 24 are advantageously selected to allow protracted operation in snow, sand and mud without undue wear or corrosion.

The middle tension springs 22 when extended are disposed at the edge of the tire tread, as best shown in FIG. 1. Lateral forces are transmitted between the grip assemblies 16 through the tension springs 20, 22 and 24. The tension springs 20, 22 and 24 advantageously force the outer end portions of the grip assemblies 16 to assume the shape conformed to that of the tire 2 and at the same time the peripheral load imposed by the road contact forces is distributed among all of the grip assemblies.

The device R results in much increased road contact forces while obtaining a degree of compliance necessary for avoiding overstress in the grip assemblies.

The actuator 18 has an enclosure 84 secured to the support disk 6 by support pads 85 that are suitably secured to support disk 6 by standard means, such as welding, bolting, etc., as best shown in FIGS. 3 and 4. The enclosure 84 has a plurality of side openings 86 that permit the respective grip assembly 16 to retract into and extend from the actuator 18. Access holes 88 are provided on top of the enclosure 84 to enable the user to secure the device R to the steel rim 8, with the lug bolts 10 and nuts 12.

The shaft 32 of the motor 30 drives a primary gear 90 which drives a secondary gear 92 about its shaft 94, as best shown in FIG. 3. A tertiary gear 96 is secured to the underside of the secondary gear 92 and rotates therewith to drive a ring gear 98 secured to a scroll gear 54, which is rotatably secured to the shaft 32. The scroll gear 54 drives the grip assemblies 14 with substantially increased mechanical advantage owing to the several consecutive gear reductions.

Other drive mechanisms for the grip assemblies 14 may be used, such as linear electric or hydraulic actuators, etc.

The scroll gear 54 has holes 100 that line up with the holes 88 and the stud bolts 10 and nuts 12 that permit the installation of the device R to the wheel 2.

A removable cover 102 advantageously protects the entire assembly of the device R from dust, dirt, etc.

In operation, under normal road conditions, when increased traction is not necessary or desired, the grip assemblies 14 are in their fully retracted position, as best shown in FIG. 2. When road conditions warrant additional traction, the actuator 18 is activated to extend the grip assemblies 14 outwardly and radially. A switch (not shown) advantageously located in the driver compartment of the vehicle provides power to the electric motor 30, thereby rotating the various gears which results in the rotation of the scroll gear 54 which is in meshing engagement with the extensions 46 of the grip assemblies 14, as best shown in FIGS. 3 and 6. As the scroll gear 54 continues to rotate, the grip assemblies 14 are caused to extend and attain the curvilinear shape due to the flexural spring 40 having been released from respective enclosure 16 to attain its unstressed bent shape. Further, the middle and outer springs 22 and 24 are increasingly tensioned to cause the grip assemblies 14 to bend in the direction perpendicular to the plane of the wheel 2 along the periphery of the wheel 2. In its fully deployed position, the device R is ready to provide additional traction to the wheel 2, as best shown in FIGS. 1 and 4. The extension of the grip assemblies 14 is accomplished without stopping the vehicle.

The grip assemblies 14 may be extended selectively in increments between the fully retracted and fully extended positions. The motor 30 is advantageously reversible, such as a direct current motor, whose rotation can be reversed at will by reversing the power source supplying the motor through a standard switching mechanism (not shown).

While primarily intended for use in connection with civil automobile passenger vehicles, design variants are envisioned that make devices embodying the same concepts as those used in the present invention described applicable to commercial trucks and military wheeled vehicles as well. For the military environment, the use of the device R provided by the present invention eliminates in many cases the need for tracked vehicles and allows the wheeled vehicles to travel at full speed under favorable road conditions, while also rendering them capable of negotiating the unfavorable road conditions without stopping or without significant loss in speed.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A traction device for wheeled vehicles, comprising:
   a) a frame for securing to a wheel of a vehicle;
   b) a grip enclosure operably secured to said frame;
   c) a grip assembly radially slidably movable within said grip enclosure, said grip assembly having retracted and extended positions relative to said grip enclosure in the radial direction of the wheel;
   d) an actuator secured to said frame for extending retracting said grip assembly;
   e) said grip assembly including a preformed flexible outer end portion adapted to conform substantially to the peripheral cross-sectional shape of the tire when in the extended position and a substantially flat configuration when retracted position;
   f) said grip enclosure including a guide portion adapted to slidably receive said flexible portion when said grip assembly is in the retracted position such that said flexible portion is removed from the tire ground contact surface; and
   g) a sprocket chain operably secured to said preformed flexible outer end portion such that said sprocket chain provides rigidity to said preformed outer end portion in the plane of rotation of the tire and flexibility in the transverse direction into the plane of the tire.

2. A traction as in claim 1, wherein:
   a) said grip enclosure is pivotably secured to said frame.

3. A traction device as in claim 1, and further comprising:
   a) support lips disposed on said frame for providing lateral support to said grip enclosure.

4. A traction device as in claim 1, wherein:
   a) said grip enclosure is substantially a sleeve.

5. A traction device as in claim 1, wherein:
   a) said preformed outer end portion of said grip assembly includes a flat spring member.

6. A traction device as in claim 1, wherein:
   a) said grip assembly includes grip treads disposed on said flexible outer end portion.

7. A traction device as in claim 1, wherein:
   a) said grip assembly includes an extension disposed opposite said flexible outer end portion; and
   b) said extension is operably connected to said actuator thereby to retract and extend said grip assembly.

8. A traction device as in claim 7, wherein:
   a) said extension includes a plurality of gear teeth; and
   b) said actuator includes a scroll gear operably engaged with said extension gear teeth such that rotation of said scroll gear is effective to extend or retract said grip assembly.

9. A traction device for wheeled vehicles, comprising:
   a) a frame for securing to a wheel of a vehicle;
   b) a plurality of grip assemblies operably secured to said frame, each of said grip assemblies including a preformed flexible outer end portion adapted to conform substantially to the peripheral cross-sectional shape of the wheel such that said flexible outer end portion is disposed over the tire ground contact surface; and c) a first plurality of springs each connected between adjacent flexible outer end portions for distributing the load among said grip assemblies during use and for stabilizing said grip assemblies in the plane of rotation of the tire.

10. A traction device as in claim 9, and further comprising:

a) a plurality of grip enclosures operably secured to said frame; and b) each of said grip assemblies is slidably movable within respective grip enclosure, each of said grip assemblies having an extended position when said preformed flexible outer end portion is disposed over the tire ground contact surface, and a retracted position when said preformed flexible outer end portion grip is removed from the tire ground contact surface.

11. A traction device as in claim 10, and further comprising:

a) a second plurality of springs each operably secured between adjacent grip assemblies.

12. A traction device as in claim 11, and further comprising:

a) slidable connectors secured to each grip assembly such that said second plurality of springs are disposed adjacent said first plurality of springs when said grip assemblies are in the retracted position.

13. A traction device as in claim 12, wherein:

a) said grip assemblies each includes a stop adapted to said slidable connectors such that said second plurality of springs are disposed away from said grip enclosures when said grip assemblies are in the extended position.

14. A traction device as in claim 10, wherein:

a) each of said grip enclosures includes a guide portion adapted to receive said flexible outer end portion in a substantially flat configuration when said grip assemblies are in the retracted position.

15. A traction as in claim 10 wherein:

a) each of said grip enclosures is pivotably secured to said frame.

16. A traction device as in claim 15, and further comprising:

a) support lips disposed on said frame and engaging said grip enclosures for providing lateral support to said grip enclosures.

17. A traction device as in claim 10, wherein:

a) each of said grip enclosures is substantially a sleeve.

18. A traction device for wheeled vehicles, comprising:

a) a frame for securing to a wheel of a vehicle;

b) a grip enclosure operably secured to said frame;

c) a grip assembly radially slidably movable within said grip enclosure, said grip assembly having retracted and extended positions relative to said grip enclosure in the radial direction of the wheel;

d) said grip assembly including a preformed flexible outer end portion adapted to conform to the peripheral cross-sectional shape of the wheel when in the extended position;

e) sprocket chain assembly secured to said preformed flexible outer end portion such that said sprocket chain provides rigidity to said preformed outer end portion in the plane of rotation of the tire and flexibility in the transverse direction into the plane of the tire;

f) said grip assembly including an extension disposed opposite said flexible outer end portion, said extension including a plurality of gear teeth; and g) an actuator secured to said frame for extending and retracting said grip assembly, said actuator including a scroll gear operably engaged with said extension gear teeth such that rotation of said scroll gear is effective to extend or retract said grip assembly.

19. A traction device as in claim 18, wherein:

a) said actuator includes a reversible motor for driving said scroll gear.

20. A traction device as in claim 19, wherein:

a) said actuator includes a ring gear secured to said scroll gear; and b) said ring gear is driven by said motor.

21. A traction device as in claim 20, wherein:

a) said actuator includes a set of reduction gears operably disposed between said motor and said ring gear.

* * * * *